(12) United States Patent
Chen et al.

(10) Patent No.: US 10,462,476 B1
(45) Date of Patent: Oct. 29, 2019

(54) DEVICES FOR COMPRESSION/DECOMPRESSION, SYSTEM, CHIP, AND ELECTRONIC DEVICE

(71) Applicant: Shanghai Cambricon Information Technology Co., Ltd., Pudong New Area (CN)

(72) Inventors: Tianshi Chen, Pudong New Area (CN); Yuzhe Luo, Pudong New Area (CN); Qi Guo, Pudong New Area (CN); Shaoli Liu, Pudong New Area (CN); Yunji Chen, Pudong New Area (CN)

(73) Assignee: SHANGHAI CAMBRICON INFORMATION TECHNOLOGY CO., LTD., Pudong New Area (CN)

( * ) Notice: Subject to any disclaimer, the term of this patent is extended or adjusted under 35 U.S.C. 154(b) by 0 days.

(21) Appl. No.: 16/457,397

(22) Filed: Jun. 28, 2019

Related U.S. Application Data

(63) Continuation-in-part of application No. PCT/CN2017/119364, filed on Dec. 28, 2017.

(51) Int. Cl.
| | |
|---|---|
| *H04N 19/124* | (2014.01) |
| *H04N 19/42* | (2014.01) |
| *G06N 3/04* | (2006.01) |
| *H04N 19/60* | (2014.01) |
| *H04N 19/13* | (2014.11) |
| *H04N 19/182* | (2014.01) |
| *H04N 19/172* | (2014.01) |

(52) U.S. Cl.
CPC .......... *H04N 19/42* (2014.11); *G06N 3/04* (2013.01); *H04N 19/124* (2014.11); *H04N 19/13* (2014.11); *H04N 19/172* (2014.11); *H04N 19/182* (2014.11); *H04N 19/60* (2014.11)

(58) Field of Classification Search
USPC ........................................... 375/240.03
See application file for complete search history.

(56) References Cited

U.S. PATENT DOCUMENTS

| | | | | |
|---|---|---|---|---|
| 5,424,773 A | * | 6/1995 | Saito | G06T 15/205 |
| | | | | 348/218.1 |
| 2006/0245500 A1 | * | 11/2006 | Yonovitz | G01S 3/7865 |
| | | | | 375/240.19 |

(Continued)

FOREIGN PATENT DOCUMENTS

CN    105184362 A    12/2015

OTHER PUBLICATIONS

Chen, et al., "A Small-Footprint Accelerator for Large-Scale Neural Networks", ACM Transactions on Computer Systems, vol. 33, No. 2, Article 6, May 2015, 27 pages.

(Continued)

*Primary Examiner* — Behrooz M Senfi

(57) ABSTRACT

Aspects of data compression/decompression for neural networks are described herein. The aspects may include a model data converter configured to convert neural network content values into pseudo video data. The neural network content values may refer to weight values and bias values of the neural network. The pseudo video data may include one or more pseudo frames. The aspects may further include a compression module configured to encode the pseudo video data into one or more neural network data packages.

20 Claims, 6 Drawing Sheets

(56) References Cited

U.S. PATENT DOCUMENTS

| | | | | |
|---|---|---|---|---|
| 2006/0268980 | A1* | 11/2006 | Le Dinh | H04N 17/004 375/240.01 |
| 2017/0124400 | A1* | 5/2017 | Yehezkel Rohekar | G06K 9/00335 |
| 2018/0330239 | A1* | 11/2018 | Chen | G06N 3/00 |

OTHER PUBLICATIONS

Du, et al., "An Accelerator for High Efficient Vision Processing", IEEE Transactions on Computer-aided Design of Integrated Circuits and System, vol. 36, No. 2, Feb. 2017, pp. 227-240.

Liu, et al., "Cambricon: An Instruction Set Architecture for Neural Networks", 2016 ACM/IEEE 43rd Annual International Symposium on Computer Architecture, Oct. 12, 2016, pp. 393-405.

Zhang, et al., "Cambricon-X An Accelerator for Sparse Neural Networks", The 49th Annual IEEE/ACM International Symposium on Microarchitecture Article No. 20, Oct. 15, 2016, 12 pages.

Chen, et al., "DaDianNao: A Machine-Learning Supercomputer", 2014 47th Annual IEEE/ACM International Symposium on Microarchitecture, Dec. 13, 2014, pp. 609-622.

Luo, et al., "DaDianNao: A Neural Network Supercomputer", IEEE Transaction on Computers, vol. 66, No. 1, Jan. 2017, pp. 73-88.

Chen, et al., "DianNao: A Small-Footprint High-Throughput Accelerator for Ubiquitous Machine-Learning", ASPLOS 14, Proceedings of the 19th international conference on Architectural Support for Programming Languages and Operating Systems, Mar. 1-5, 2014, pp. 269-283.

Chen, et al., "DianNao Family: Energy-Efficient Hardware Accelerators for Machine Learning", Communications of he ACM, vol. 59, No. 11, Nov. 2016, pp. 105-112.

Liu, et al., "PuDianNao: A Polyvalent Machine Learning Accelerator", ASPLOS '15 Proceedings of the Twentieth International Conference on Architectural Support for Programming Languages and Operating Systems, Mar. 14-18, 2015, pp. 369-381.

Du, et al., "ShiDianNao: Shifting Vision Processing Closer to the Sensor", ISCA '15 Proceedings of the 42nd Annual International Symposium on Computer Architecture, Jun. 13-17, 2015, pp. 92-104.

PCT/CN2017/119364—International Search Report dated Mar. 19, 2018, 12 pages (10 pages in Chinese, 2 pages of English translation).

Han, et al., Deep Compression: Compressing Deep Neural Networks with Pruning, Trained Quantization and Huffman Coding, Feb. 15, 2016, 14 pages.

Gong, et al., Compressing Deep Convolutional Networks Using Vector Quantization, Dec. 18, 2014, 10 pages.

\* cited by examiner

DEVICES FOR COMPRESSION/DECOMPRESSION, SYSTEM, CHIP, AND ELECTRONIC DEVICE

BACKGROUND

Artificial Neural Networks (ANNs), or Neural Networks (NNs) for short, are algorithmic mathematical models imitating the behavior characteristics of animal neural networks and performing the distributed concurrent information processing. Depending on the complexity of a system, such networks adjust interconnection among a great number of internal nodes, thereby achieving the purpose of information processing. The algorithm used by NNs may be vector multiplication (also referred to as "multiplication") and convolution, which widely adopts sign functions and various approximations thereof.

As neural networks in animal brains, NNs consist of multiple interconnected nodes. As shown in FIG. 3, each block represents a node and each arrow represents a connection between two nodes.

The calculation formula of a neuron can be briefly described as $$y = f\left(\sum_{i=0}^{n} w_i * x_i\right),$$

wherein x represents input data received at all input nodes connected to the output nodes, w represents corresponding weight values between the input nodes and the output nodes, and f(x) is a nonlinear function, usually known as an activation function including those commonly used functions such as $$\frac{1}{1+e^{-x}} \text{ and } \frac{e^x - e^{-x}}{e^x + e^{-x}}.$$

NNs are widely applied to a variety of applications, such as computer vision, voice recognition and natural language processing. In recent years, the scale of NNs has been growing. For example, in 1998, Lecun's neural network for handwriting characters recognition includes less than 1M weight values; while in 2012, Krizhevsky for participating ImageNet competition includes 60M weight values.

As deep learning technology develops, the scale of the current neural network and the amount of neural network data are increasing, which imposes growing demands on storage performance and memory access bandwidth.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

One example aspect of the present disclosure provides an example neural network system. The example neural network system may include a model data converter configured to convert neural network content values into pseudo video data. The neural network content values may refer to weight values and bias values of the neural network. The pseudo video data may include one or more pseudo frames. The example neural network system may further include a compression module configured to encode the pseudo video data into one or more neural network data packages.

Another example aspect of the present disclosure provides an example method for compressing and decompressing neural network data. The example method may include converting, by a model data converter, neural network content values into pseudo video data. The neural network content values may include one or more weight values and one or more bias values. The pseudo video data includes one or more pseudo frames. The example method may further include encoding, by a compression module, the pseudo video data into one or more neural network data packages.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
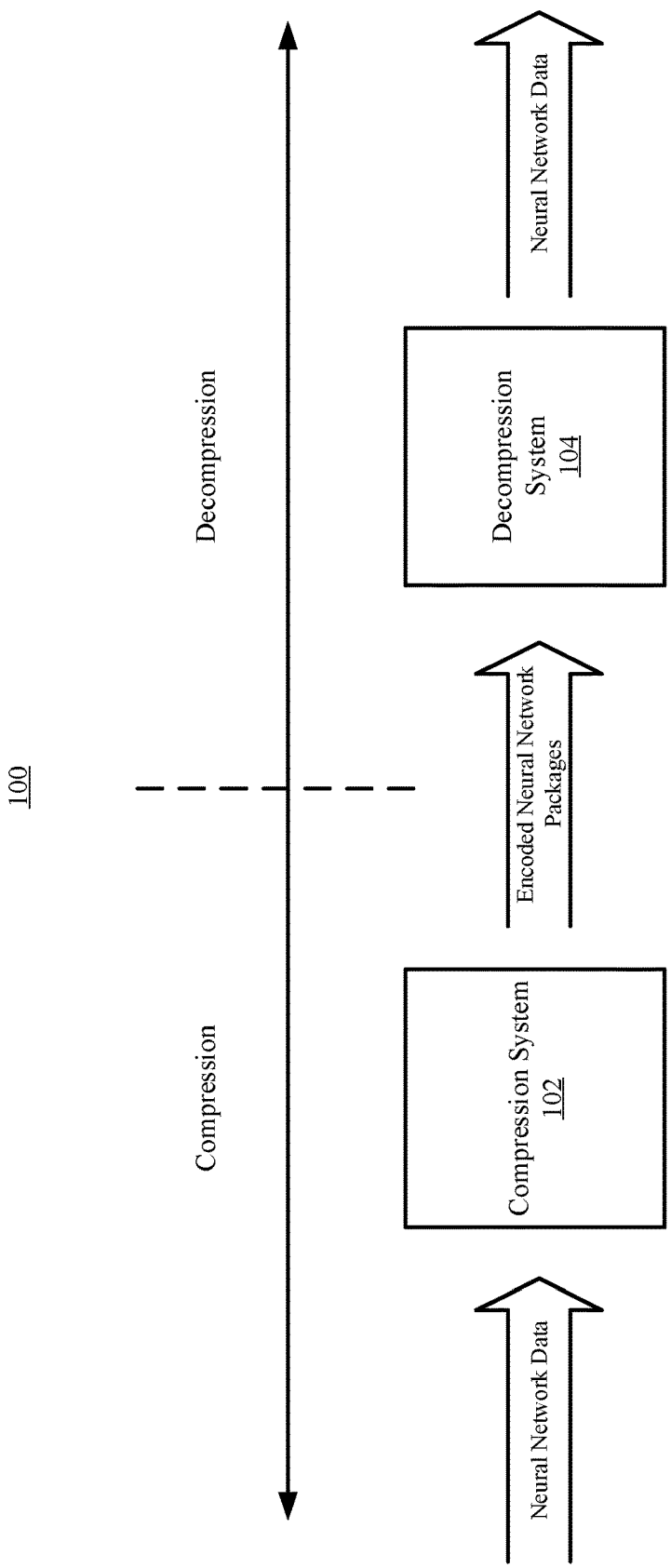
FIG. 1 is a block diagram illustrating an example process for compressing, transmitting, and decompressing neural network data.

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

In the present disclosure, the term "comprising" and "including" as well as their derivatives mean to contain rather than limit; the term "or," which is also inclusive, means and/or.

In this specification, the following various embodiments used to illustrate principles of the present disclosure are only for illustrative purpose, and thus should not be understood as limiting the scope of the present disclosure by any means. The following description taken in conjunction with the accompanying drawings is to facilitate a thorough understanding of the illustrative embodiments of the present disclosure defined by the claims and its equivalent. There are specific details in the following description to facilitate understanding. However, these details are only for illustrative purpose. Therefore, persons skilled in the art should understand that various alternation and modification may be made to the embodiments illustrated in this description without going beyond the scope and spirit of the present disclosure. In addition, for clear and concise purpose, some known functionality and structure are not described. Besides, identical reference numbers refer to identical function and operation throughout the accompanying drawings.

Neural network data, in general, may include neural network content values and neural network structural information. The neural network content values may refer to weight values and bias values of the neural network. The neural network structural information may refer to connection data that indicates connections between input nodes and output nodes of a neural network, counts of nodes in each layer of the neural network, and types of activation functions of the neural work. As the scale of neural networks increase, the amount of the neural network content values may also increase. Migration of the neural network data may be more efficient when the neural network content values are compressed prior to the migration.

Neural network content values at least at some level are similar to video data. Typically, video data may include one or more frames that further include one or more pixels. The color of each pixel may be correlated with the colors of adjacent pixels in a same frame. Additionally, the color of one pixel may be correlated with the colors of pixels at the same position of adjacent frames. The correlation between pixels may be referred to as spatial correlation.

With respect to the neural network content values, weight values may be also spatially correlated with other adjacent weight values. Thus, some compression methods for video data may be effective in compressing neural network content values in a form of pseudo video data.

FIG. 1 is a block diagram illustrating an example process 100 for compressing, transmitting, and decompressing neural network data. As depicted, the example process 100 may include receiving neural network data by a compression system 102. The compression system 102 may be configured to compress the received neural network data by encoding the neural network data in accordance with one or more compression algorithms into one or more encoded neural network packages. Hereinafter, compressing may refer to as encoding interchangeably. The encoded neural network packages may be transmitted to a decompression system 104. As the size of the neural network data may be reduced after compression, the transmission of the encoded neural network packages may require less bandwidth and/or become more efficient. Upon receiving the encoded neural network packages, the decompression system 104 may be configured to decompress the encoded neural network packages to restore the neural network data.

Figure 2:
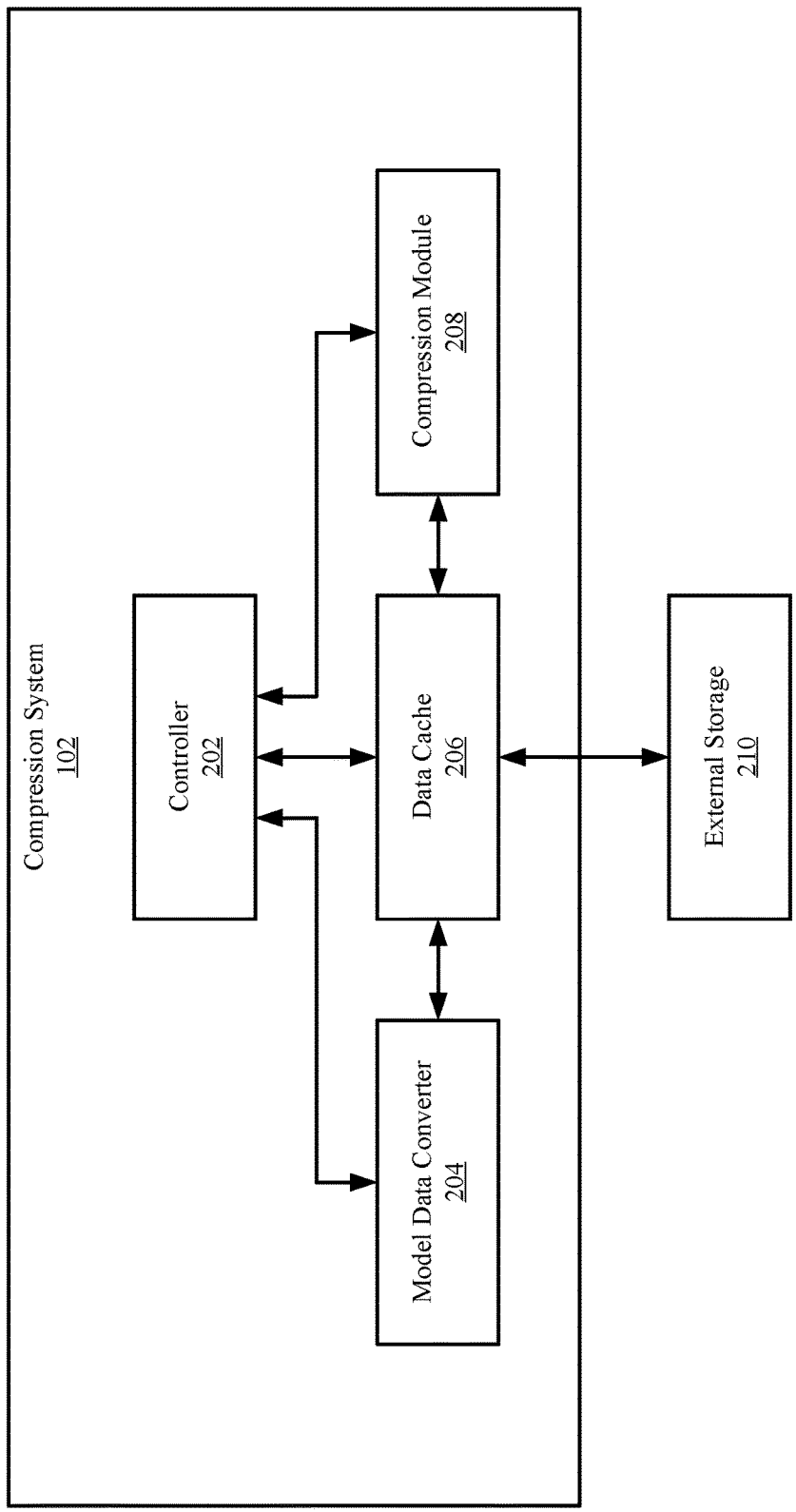
FIG. 2 is a block diagram illustrating an example compression system for compressing neural network data.
Figure 3:
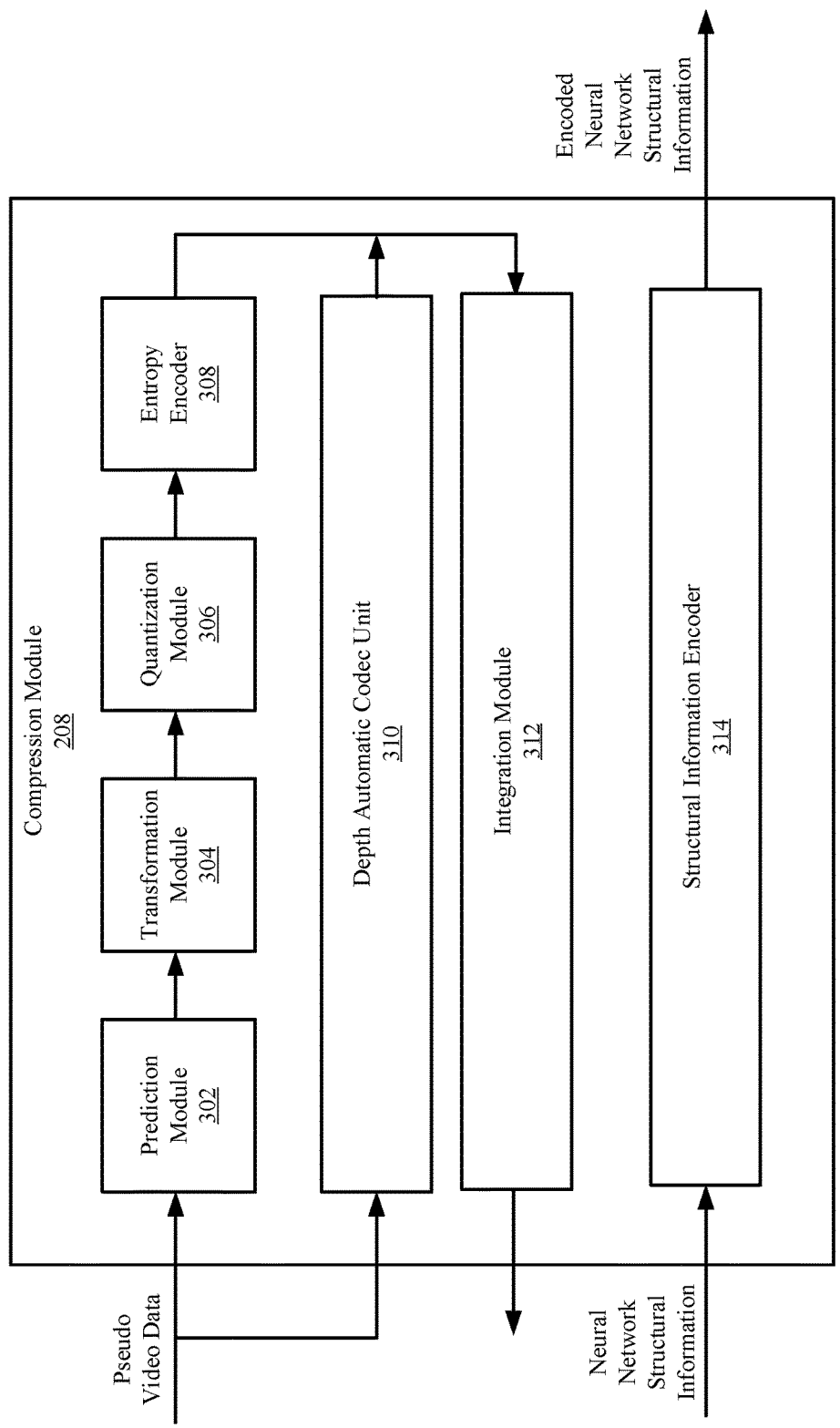
FIG. 3 is a block diagram illustrating an example compression module for compressing neural network data.
Figure 4:
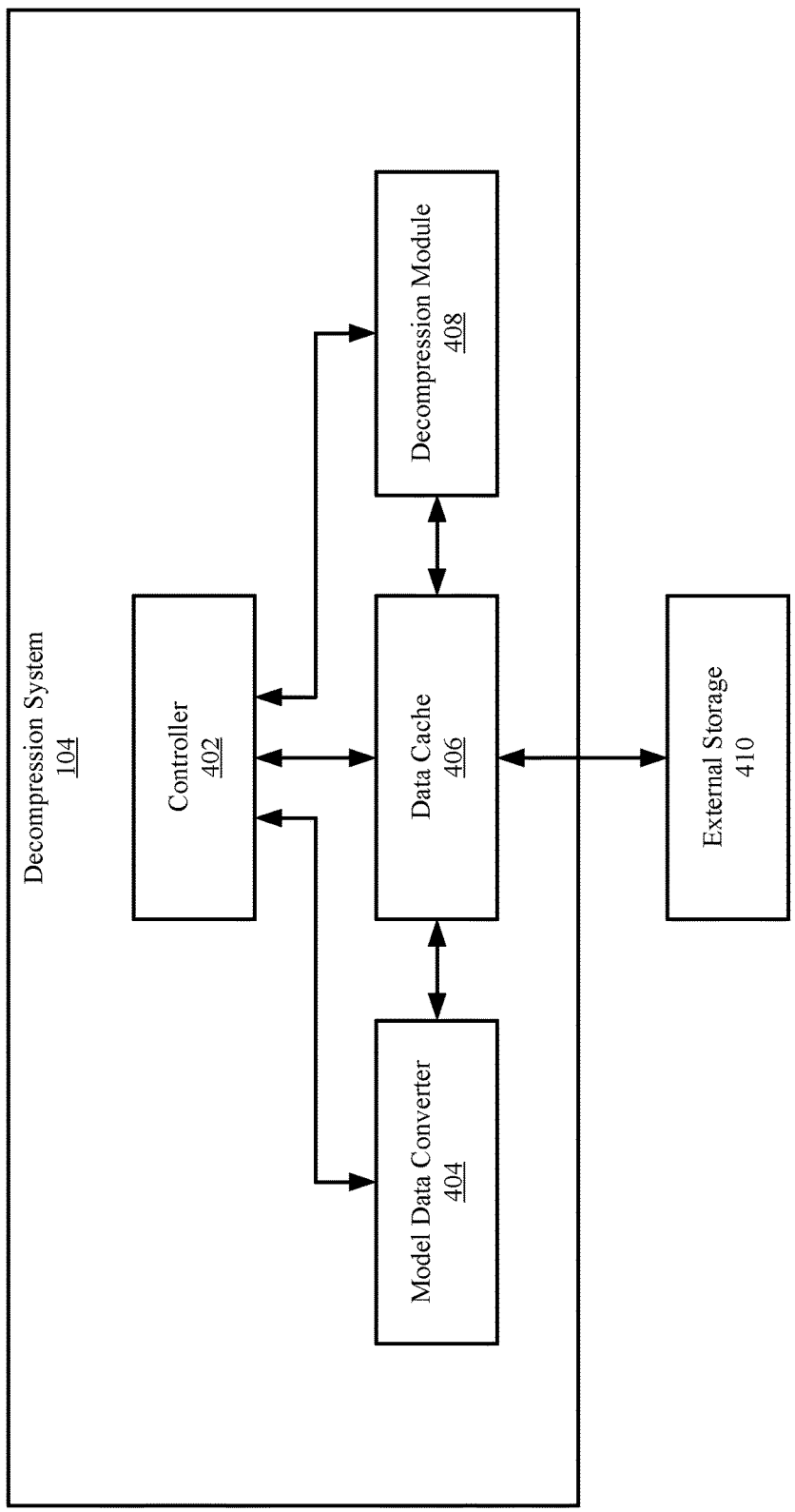
FIG. 4 is a block diagram illustrating an example decompression system for decompressing neural network data.

In at least some examples, the decompression system 104 may include hardware, software, or firmware components that are similar to those of the compression system 102 as illustrated in FIGS. 2-4.

FIG. 2 is a block diagram illustrating an example compression system 102 for compressing neural network data. As depicted, the example compression system 102 may include a controller 202, a model data converter 204, a data cache 206, and a compression module 208. The data cache 206 may be configured to temporarily store neural network data received from an external storage 210.

In some examples, the controller 202 may be configured to transmit a data read instruction to the data cache 206 to request neural network data from the external storage 210. Subsequently, the controller 202 may transmit another data read instruction to the model data converter 204. In response to the data read instruction, the model data converter 204 may be configured to read the neural network data from the data cache 206.

The controller 202 may be configured to transmit a data conversion instruction to the model data converter 204. The model data converter 204, in response to the data conversion instruction, may be configured to convert at least a part of the neural network data, e.g., neural network content values, into pseudo video data.

As described above, the neural network content values may include weight values and bias values of the neural network. The model data converter 204 may be configured to convert each of the neural network content values into an integer, similar to values of pixels that are within a color range.

For example, the model data converter 204 may be configured to determine a first range of the neural network content values, e.g., [−b, a], in which a and −b are both integers and respectively represent the upper limit and the lower limit of the first range. Further, the model data converter 204 may be configured to convert the neural network content values into integers within a second range. For example, the second range may be [0, 255] corresponding to a color depth of 8 bits per pixel (bpp). Thus, a neural network content value may be converted to a pseudo pixel, the value of the pseudo pixel being an integer within the second range. The value of a pseudo pixel may refer to an integer within a data range predetermined by the color depth.

In more detail, further to the example that the second range is set to [0, 255], the model data converter 204 may be configured to convert the neural network content values into pseudo pixels in accordance with the following equation:

$$I = \left\lceil \frac{255(w+b)}{a+b} \right\rceil$$

in which I may refer to the value of a pseudo pixel that falls within [0, 255], w may refer to a neural network content value within the first range of [−b, a]. In other examples, the model data converter 204 may be configured to convert the neural network content values into pseudo pixels in accordance with the following equation:

$$I = \left\lceil \frac{(2^t - 1)(w+b)}{a+b} \right\rceil$$

in which t refers to the color depth.

In at least some examples, the neural network content values may be respectively corresponding to different convolution kernels. The model data converter 204 may be configured to group or combine those pseudo pixels converted from neural network content values that correspond to a same convolution kernel into a pseudo frame.

The controller 202 may be further configured to transmit a data read instruction to the data cache 206. The data cache 206 may be configured to, in response to the data read instruction, read the pseudo video data from the model data converter 204. The compression module 208, in response to another data read instruction from the controller 202, may be configured to read the pseudo video data from the data cache 206. The compression module 208 may be further configured to compress the pseudo video data in accordance with one or more compression algorithms as described in FIG. 3.

FIG. 3 is a block diagram illustrating an example compression module 208 for compressing neural network data. As depicted, the pseudo video data may be received by the compression module 208. In at least some examples, the pseudo video data may carry at least some information that determined whether to be compressed by a depth automatic codec unit 310.

In some examples, the pseudo video data may be sequentially compressed by a prediction module 302, a transformation module 304, a quantization module 306, and an entropy encoder 308. It is notable that the compression may be performed by one or more of the prediction module 302, the transformation module 304, the quantization module 306, and an entropy encoder 308 in a different sequence.

The prediction module 302 may be configured to compress the pseudo video data based on a prediction based on one or more differences between a predicted frame and each of the one or more pseudo frames. With respect to typical video data, the pixels and the frames may be spatially correlated as described above. In an example of three consecutive frames, a middle frame may be restored based on a prediction based on the first frame and the last frame. Similarly, the pseudo frames corresponding to different convolution kernels may also be spatially correlated. With respect to the pseudo video data, the prediction module 302 may be configured to determine a prediction of each pseudo pixel and calculate a difference between each pseudo pixel and the prediction. The differences for the pseudo pixels in the pseudo video data may be encoded by the prediction module 302 to generate one or more first stage compression results.

In some examples, the first stage compression results may be transmitted to a transformation module 304. The transformation module 304 may be configured to apply an orthogonal transformation to the first stage compression results. In some other examples, the pseudo video data may be directly transmitted to the transformation module 304 and the transformation module 304 may apply the orthogonal transformation to the pseudo video data.

In more detail, the transformation module 304 may be configured to apply a two-dimensional discrete cosine transformation (DCT) to the first stage compression results. In an example pseudo frame, assuming f(m, n) refers to the value of the pixel at the position (m, n), the transformation module 304 may be configured to apply the two-dimensional DCT to generate second stage compression results in accordance with the following equation:

$$F(u, v) = \frac{2}{N} c(u)c(v) \sum_{m=0}^{N-1} \sum_{n=0}^{N-1} f(m, n) \cos\left[\frac{\pi}{2N}(2m+1)u\right] \cos\left[\frac{\pi}{2N}(2n+1)v\right]$$

in which u, v=0, 1, . . . , N−1 and F(u, v) refers to the value of the pixel at the position (u, v) after the DCT, when u=0 (v=0), c(u)=1/√2 and c(v)=1/√2; when u, v=1, . . . , N−1, c(u)=1 and c(v)=1.

The second stage compression results may be transmitted to a quantization module 306. The quantization module 306 may be configured to compress the second stage compression results according to quantization encoding. In some other examples, the pseudo video data may be directly transmitted to the quantization module 306 and the quantization module 306 may apply the quantization encoding to the pseudo video data.

In some examples, the quantization module 306 may be configured to apply a scalar quantization to the second stage compression results in accordance with the following equation:

$$FQ(u, v) = \text{round}\left(\frac{F(u, v)}{Q_{step}}\right)$$

in which F(u, v) refers to the value of the pixel at the position (u, v) after the orthogonal transformation, $Q_{step}$ may refer to a quantization step predetermined by a system administrator, FQ (u, v) may refer to third stage compression results at the position (u, v), and round 0 may refer to a rounding function.

The third stage compression results may be transmitted to an entropy encoder 308. In some other examples, the pseudo video data may be directly transmitted to the entropy encoder 308 and the entropy encoder 308 may apply code rate compression encoding (e.g., Huffman encoding) to the pseudo video data.

In some example, with respect to values in the third stage compression results, the entropy encoder 308 may be configured to assign relatively long binary codes to those values of higher probabilities of occurrence and relatively short binary codes to those values of lower probabilities of occurrence.

In some alternative examples, the pseudo video data may be processed by the depth automatic code unit 310, rather than the prediction module 302, the transformation module 304, the quantization module 306, and the entropy encoder 308. The depth automatic codec unit 310 may be configured to input the pseudo video data into a neural network. The output at hidden layers of the neural network may be output as the encoded results. As the count of nodes at the hidden layers are generally less than the nodes at the input layers, the input may be compressed.

Compression results output at the entropy encoder 308 or the depth automatic codec unit 310 may be transmitted to an integration module 312. The integration module 312 may be configured to integrate the compression results with a process indicator to generate one or more neural network data packages. The process indicator may refer to an indicator that indicates whether the pseudo video data was processed by which ones among the depth automatic codec unit 310, the prediction module 302, the transformation module 304, the quantization module 306, and/or the entropy encoder 308.

In some other examples, the neural network structural information in the neural network data may be compressed or encoded by a structural information encoder 314. The structural information encoder 314 may be configured to record a count of nodes in each layer of the neural network, respectively assign a value to different activation functions in the neural network, and generate a matrix that indicates connection data between input nodes and output nodes of a neural network.

FIG. 4 is a block diagram illustrating an example decompression system 104 for decompressing neural network data. As depicted, the decompression system 104 may include a controller 402, a model data converter 404, a data cache 406, and a compression module 408. The data cache 406 may be configured to temporarily store neural network data packages received from an external storage 410.

In some examples, the controller 402 may be configured to transmit a data read instruction to the data cache 406 to request neural network data packages from the external storage 410. Subsequently, the controller 402 may transmit another data read instruction to the decompression module 408. In response to the data read instruction, the decompression module 408 may be configured to read the neural network data packages from the data cache 406 and further decompress the neural network data packages into pseudo video data. The decompression module 408 may be described in greater detail in FIG. 5. The pseudo video data may be temporarily stored in the data cache 406

The controller 402 may be further configured to send a data read instruction to the model data converter 404. The model data converter 404 may be configured to convert the pseudo video data to the neural network data in accordance with the following equation:

$$w = \frac{(a+b) \times I}{(2^t - 1)} - b$$

in which I may refer to the value of a pseudo pixel, a and −b are both integers and respectively represent the upper limit and the lower limit of the first range [−b, a], and t refers to the color depth.

Figure 5:
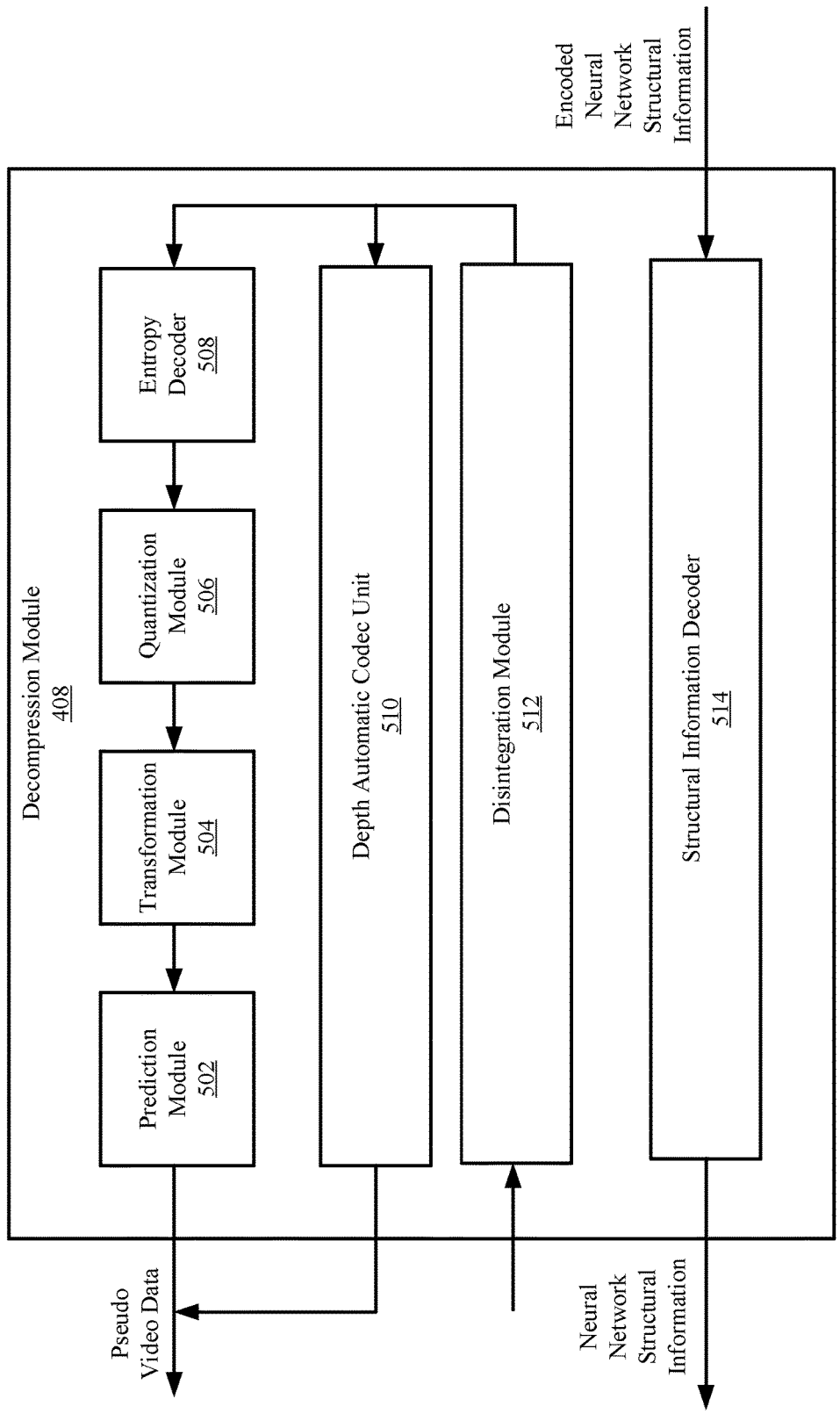
FIG. 5 is a block diagram illustrating an example decompression module for decompressing neural network data.

FIG. 5 is a block diagram illustrating an example decompression module 408 for decompressing neural network data. As depicted, the decompression module 408 may include a structural information decoder 514 configured to decode the encoded neural network structural information. For example, the structural information decoder 514 may be configured to decode the encoded neural network structural information to generate structural information of the neural network including connection data between input nodes and output nodes of the neural network, a count of nodes in each layer of the neural network, and a type of an activation function of the neural work.

The decompression module 408 may further include a disintegration module 512 configured to disintegrate the neural network data packages to isolate the process indicator. Based on the process indicator, the disintegration module 512 may be configured to transmit the neural network data packages to a depth automatic codec unit 510 or an entropy decoder 508, a quantization module 506, a transformation module 504, or a prediction module 502.

In an example that the process indicator indicates that the neural network data packages were previously compressed by the depth automatic codec unit 310, the neural network data packages may be transmitted to the depth automatic codec unit 510. The depth automatic codec unit 510 may first decode the neural network data packages to obtain decoding side information of the depth automatic encoder used in the encoding, construct a decoder using the decoding side information, and then decode the neural network data packages using the decoder.

In some other examples, the neural network data packages may be transmitted to the entropy decoder 508. The entropy decoder 508 may be configured to implement a decoding process corresponding to the encoding algorithm by the entropy encoder 308 (e.g., Huffman encoding) to generate first stage decompression results.

The first stage decompression results may be transmitted to the quantization module 306. The quantization module 306 may be configured to decompress the first stage decompression results to generate second stage decompression results in accordance with the following equation:

$$F(u,v) = FQ(u,v) \cdot Q_{step}$$

in which F(u, v) refers to the value of the pixel at the position (u, v), $Q_{step}$ may refer to the predetermined quantization step, FQ (u, v) may refer to first stage decompression results at the position (u, v).

The second stage decompression results may be transmitted to the transformation module 304. The transformation module 304 may be configured to decompress the second stage decompression results to generate third stage decompression results in accordance with the following equation:

$$f(m,n) = \frac{2}{N} \sum_{u=0}^{N-1} \sum_{v=0}^{N-1} c(u)c(v)F(u,v)\cos\left[\frac{\pi}{2N}(2m+1)u\right]\cos\left[\frac{\pi}{2N}(2n+1)v\right]$$

in which f(m, n) refers to the value of the pixel at the position (m, n) in the third stage decompression results; u, v=0, 1, ..., N−1 and F(u, v) refers to the value of the pixel at the position (u, v) in the second stage decompression results, when u=0 (v=0), c(u)=1/$\sqrt{2}$ and c(v)=1/$\sqrt{2}$; when u, v=1, ..., N−1, c(u)=1 and c(v)=1.

The third stage decompression results may be transmitted to the prediction module 502. The prediction module 502 may be configured to add the prediction of each pseudo pixel to the calculated difference between each pseudo pixel and the prediction to generate the pseudo video data. The pseudo video data may be transmitted to the model data converter 404 for further conversion.

Figure 6:
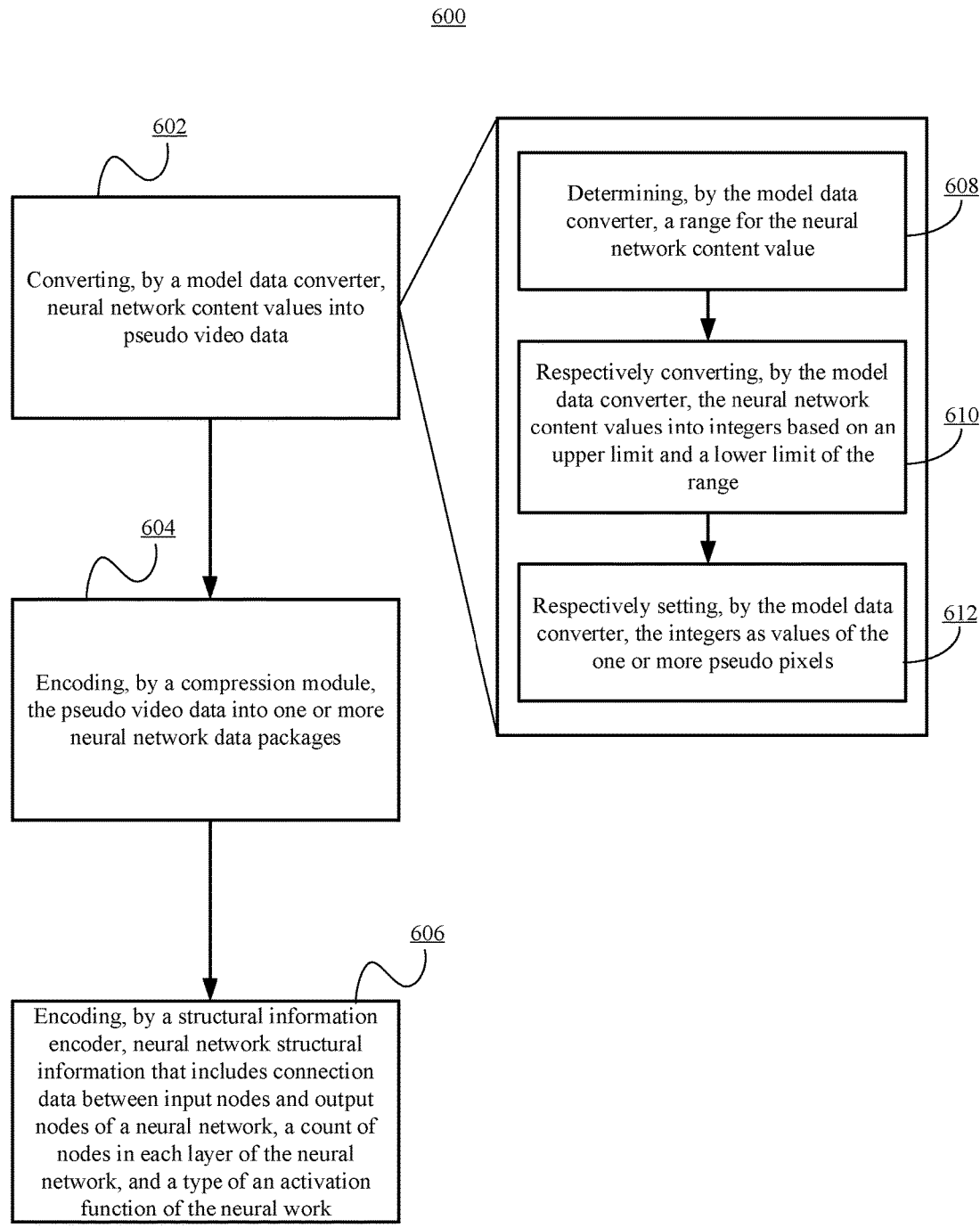
FIG. 6 is a flow chart illustrating an example method for compressing neural network data.

FIG. 6 is a flow chart illustrating an example method 600 for compressing neural network data. The example method 600 may be performed by components described in FIGS. 1-3.

At block 602, the example method 600 may include converting, by a model data converter, neural network content values into pseudo video data. For example, the model data converter 204 may be configured to convert each of the neural network content values into an integer, similar to values of pixels that are within a color range.

At block 608, the example method 600 may include determining, by the model data converter, a range for the neural network content value. For example, the model data converter 204 may be configured to determine a first range of the neural network content values, e.g., [−b, a], in which a and −b are both integers and respectively represent the upper limit and the lower limit of the first range.

At block 610, the example method 600 may include respectively converting, by the model data converter, the neural network content values into integers based on an upper limit and a lower limit of the range. For example, the model data converter 204 may be configured to convert the neural network content values into integers within a second range.

At block 612, the example method 600 may include respectively setting, by the model data converter, the integers as values of the one or more pseudo pixels. For example, the second range may be [0, 255] corresponding to a color depth of 8 bits per pixel (bpp). Thus, a neural network content value may be converted to a pseudo pixel, the value of the pseudo pixel being an integer within the second range. The value of a pseudo pixel may refer to an integer within a data range predetermined by the color depth.

At block 604, the example method 600 may include encoding, by a compression module, the pseudo video data into one or more neural network data packages.

In some examples, the pseudo video data may be sequentially compressed by a prediction module 302, a transformation module 304, a quantization module 306, and an entropy encoder 308. It is notable that the compression may be performed by one or more of the prediction module 302, the transformation module 304, the quantization module 306, and an entropy encoder 308 in a different sequence.

The prediction module 302 may be configured to compress the pseudo video data based on a prediction based on one or more differences between a predicted frame and each of the one or more pseudo frames. With respect to typical video data, the pixels and the frames may be spatially correlated as described above. In an example of three consecutive frames, a middle frame may be restored based on a prediction based on the first frame and the last frame. Similarly, the pseudo frames corresponding to different convolution kernels may also be spatially correlated. With respect to the pseudo video data, the prediction module 302 may be configured to determine a prediction of each pseudo pixel and calculate a difference between each pseudo pixel and the prediction. The differences for the pseudo pixels in the pseudo video data may be encoded by the prediction module 302 to generate one or more first stage compression results.

In some examples, the first stage compression results may be transmitted to a transformation module 304. The transformation module 304 may be configured to apply an orthogonal transformation to the first stage compression results. In some other examples, the pseudo video data may be directly transmitted to the transformation module 304 and the transformation module 304 may apply the orthogonal transformation to the pseudo video data.

In more detail, the transformation module 304 may be configured to apply a two-dimensional discrete cosine transformation (DCT) to the first stage compression results. In an example pseudo frame, assuming f(m, n) refers to the value of the pixel at the position (m, n), the transformation module 304 may be configured to apply the two-dimensional DCT to generate second stage compression results in accordance with the following equation:

$$F(u, v) = \frac{2}{N} c(u)c(v) \sum_{m=0}^{N-1} \sum_{n=0}^{N-1} f(m, n) \cos\left[\frac{\pi}{2N}(2m+1)u\right] \cos\left[\frac{\pi}{2N}(2n+1)v\right]$$

in which u, v=0, 1, ..., N−1 and F(u, v) refers to the value of the pixel at the position (u, v) after the DCT, when u=0 (v=0), c(u)=1/√2 and c(v)=1/√2; when u, v=1, ..., N−1, c(u)=1 and c(v)=1.

The second stage compression results may be transmitted to a quantization module 306. The quantization module 306 may be configured to compress the second stage compression results according to quantization encoding. In some other examples, the pseudo video data may be directly transmitted to the quantization module 306 and the quantization module 306 may apply the quantization encoding to the pseudo video data.

In some examples, the quantization module 306 may be configured to apply a scalar quantization to the second stage compression results in accordance with the following equation:

$$FQ(u, v) = \text{round}\left(\frac{F(u, v)}{Q_{step}}\right)$$

in which F(u, v) refers to the value of the pixel at the position (u, v) after the orthogonal transformation, $Q_{step}$ may refer to a quantization step predetermined by a system administrator, FQ (u, v) may refer to third stage compression results at the position (u, v), and round () may refer to a rounding function.

The third stage compression results may be transmitted to an entropy encoder 308. In some other examples, the pseudo video data may be directly transmitted to the entropy encoder 308 and the entropy encoder 308 may apply code rate compression encoding (e.g., Huffman encoding) to the pseudo video data.

In some example, with respect to values in the third stage compression results, the entropy encoder 308 may be configured to assign relatively long binary codes to those values of higher probabilities of occurrence and relatively short binary codes to those values of lower probabilities of occurrence.

In some alternative examples, the pseudo video data may be processed by the depth automatic code unit 310, rather than the prediction module 302, the transformation module 304, the quantization module 306, and the entropy encoder 308. The depth automatic codec unit 310 may be configured to input the pseudo video data into a neural network. The output at hidden layers of the neural network may be output as the encoded results. As the count of nodes at the hidden layers are generally less than the nodes at the input layers, the input may be compressed.

Compression results output at the entropy encoder 308 or the depth automatic codec unit 310 may be transmitted to an integration module 312. The integration module 312 may be configured to integrate the compression results with a process indicator to generate one or more neural network data packages.

At block 606, the example method 600 may include encoding, by a structural information encoder, neural network structural information that includes connection data between input nodes and output nodes of a neural network, a count of nodes in each layer of the neural network, and a type of an activation function of the neural work. For example, the structural information encoder 314 may be configured to record a count of nodes in each layer of the neural network, respectively assign a value to different activation functions in the neural network, and generate a matrix that indicates connection data between input nodes and output nodes of a neural network.

The process or method described in the above accompanying figures can be performed by process logic including hardware (for example, circuit, specific logic, etc.), firmware, software (for example, a software being externalized in a non-transitory computer-readable medium), or the combination of the above two. Although the process or method is described above in a certain order, it should be understood that some operations described may also be performed in different orders. In addition, some operations may be executed concurrently rather than in order.

In the above description, each embodiment of the present disclosure is illustrated with reference to certain illustrative embodiments. Apparently, various modifications may be made to each embodiment without going beyond the wider spirit and scope of the present disclosure presented by the affiliated claims. Correspondingly, the description and accompanying figures should be understood as illustration only rather than limitation. It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

We claim:

1. A neural network system, comprising:
a model data converter configured to:
convert neural network content values into pseudo video data,
wherein the neural network content values include one or more weight values and one or more bias values,
wherein the pseudo video data includes one or more pseudo frames, and
wherein each of the one or more pseudo frames include one or more pseudo pixels,
determine a range for the neural network content values,
respectively convert the neural network content values into integers based on an upper limit and a lower limit of the range, and
respectively set the integers as values of the pseudo pixels; and
a compression module configured to encode the pseudo video data into one or more neural network data packages.

2. The neural network system of claim 1, wherein the model data converter is configured to convert the neural network content values into the one or more pseudo pixels in accordance with a following equation:

$$I = \left\lceil \frac{(2^t - 1)(w + b)}{a + b} \right\rceil$$

in which t represents a color depth and w may refer to one of the neural network content values within the range of [−b, a].

3. The neural network system of claim 1, wherein the model data converter is further configured to combine the one or more pseudo pixels into the one or more pseudo frames.

4. The neural network system of claim 1, wherein the compression module is configured to encode the pseudo video data based on one or more differences between a predicted frame and each of the one or more pseudo frames.

5. The neural network system of claim 1, wherein the compression module is configured to perform an orthogonal transformation to the pseudo video data to encode the pseudo video data.

6. The neural network system of claim 1, wherein the compression module is configured to perform quantization encoding based on a predetermined quantization step to encode the pseudo video data.

7. The neural network system of claim 1, wherein the compression module is configured to encode the pseudo video data based on probabilities of the one or more pseudo pixels.

8. The neural network system of claim 1, wherein the compression module is configured to input the pseudo video data to a neural network and to determine output data at hidden layers of the neural network as the one or more neural network data packages.

9. The neural network system of claim 1, further comprising a structural information encoder configured to encode neural network structural information that includes connection data between input nodes and output nodes of a neural network, a count of nodes in each layer of the neural network, and a type of an activation function of the neural work.

10. The neural network system of claim 1, further comprising a decompression module configured to decode the one or more neural network data packages, wherein the model data converter is further configured to convert the decoded neural network data packages into the neural network content values.

11. A method for processing neural network data, comprising:
converting, by a model data converter, neural network content values into pseudo video data,
wherein the neural network content values include one or more weight values and one or more bias values,
wherein the pseudo video data includes one or more pseudo frames, and
wherein each of the one or more pseudo frames include one or more pseudo pixels;
determining, by the model data converter, a range for the neural network content value;
respectively converting, by the model data converter, the neural network content values into integers based on an upper limit and a lower limit of the range; and
respectively setting, by the model data converter, the integers as values of the one or more pseudo pixels; and
encoding, by a compression module, the pseudo video data into one or more neural network data packages.

12. The method of claim 11, further comprising converting the neural network content values into the one or more pseudo pixels in accordance with a following equation:

$$I = \left\lceil \frac{(2^t - 1)(w + b)}{a + b} \right\rceil$$

in which t represents a color depth and w may refer to one of the neural network content values within the range of [−b, a].

13. The method of claim 11, further comprising combining, by the model data converter, the one or more pseudo pixels into the one or more pseudo frames.

14. The method of claim 11, further comprising encoding, by the compression module, pseudo video data based on one or more differences between a predicted frame and each of the one or more pseudo frames.

15. The method of claim 11, further comprising performing, by the compression module, an orthogonal transformation to the pseudo video data to encode the pseudo video data.

16. The method of claim 11, further comprising encoding, by the compression module, the pseudo video data based on probabilities of the one or more pseudo pixels.

17. The method of claim 11, further comprising inputting, by the compression module, the pseudo video data to a neural network and to determine output data at hidden layers of the neural network as the one or more neural network data packages.

18. The method of claim 11, further comprising performing, by the compression module, quantization encoding based on a predetermined quantization step to encode the pseudo video data.

19. The method of claim 11, further comprising encoding, by a structural information encoder, neural network structural information that includes connection data between input nodes and output nodes of a neural network, a count of nodes in each layer of the neural network, and a type of an activation function of the neural work.

20. The method of claim 11, further comprising:
 decoding, by a decompression module, the one or more neural network data packages; and
 converting, by the model data converter, the decoded neural network data packages into the neural network content values.

* * * * *